United States Patent

[15] 3,667,583

Richards

[45] June 6, 1972

[54] SELF-MODULATED INPUT CLUTCH FOR VEHICLE DRIVE TRANSMISSIONS

[72] Inventor: Elmer A. Richards, Kalamazoo, Mich.

[73] Assignee: Caterpillar Tractor Co., Peoria, Ill.

[22] Filed: Apr. 22, 1970

[21] Appl. No.: 30,680

[52] U.S. Cl. .................. 192/105 A, 192/109 A, 192/18 A
[51] Int. Cl. .......................................................... F16d 23/10
[58] Field of Search .................. 192/105 A, 85 F, 89, 70.28, 192/18 A, 12 C, 109 B, 109 C

[56] References Cited

UNITED STATES PATENTS

| | | | |
|---|---|---|---|
| 3,010,555 | 10/1961 | Garmager | 192/109 A |
| 3,353,641 | 10/1967 | Chana | 192/109 A |
| 2,551,918 | 5/1951 | Wickwire et al. | 192/105 A |
| 3,209,872 | 10/1965 | Moyer et al. | 192/18 A |

Primary Examiner—Allan D. Herrmann
Assistant Examiner—Randall Heald
Attorney—Fryer, Tjensvold, Feix, Phillips & Lempio

[57] ABSTRACT

A clutch for a vehicle having a change speed gear box transmission automatically performs control functions which have heretofore required skilled manipulation of a clutch pedal or the like by the operator. Springs exerting an engagement force on the clutch plates react against a movable piston which responds to a centrifugally generated fluid pressure to increase the spring force as a function of engine speed at the lower range of engine speeds. To facilitate start-ups and to avoid stalling, additional springs automatically disengage the clutch at the idling range of engine speed. The springs and variable fluid pressure provide modulated engagement or disengagement within an intermediate range of speeds and further means engage the clutch with a fixed clutch capacity at normal operating speeds. Fluid signal means force disengagement during shift transients at higher engine speeds. Clutch action differs under different operating conditions in a manner conforming with skilled manual control of a clutch under similar conditions.

6 Claims, 6 Drawing Figures

PATENTED JUN 6 1972 3,667,583
SHEET 1 OF 4
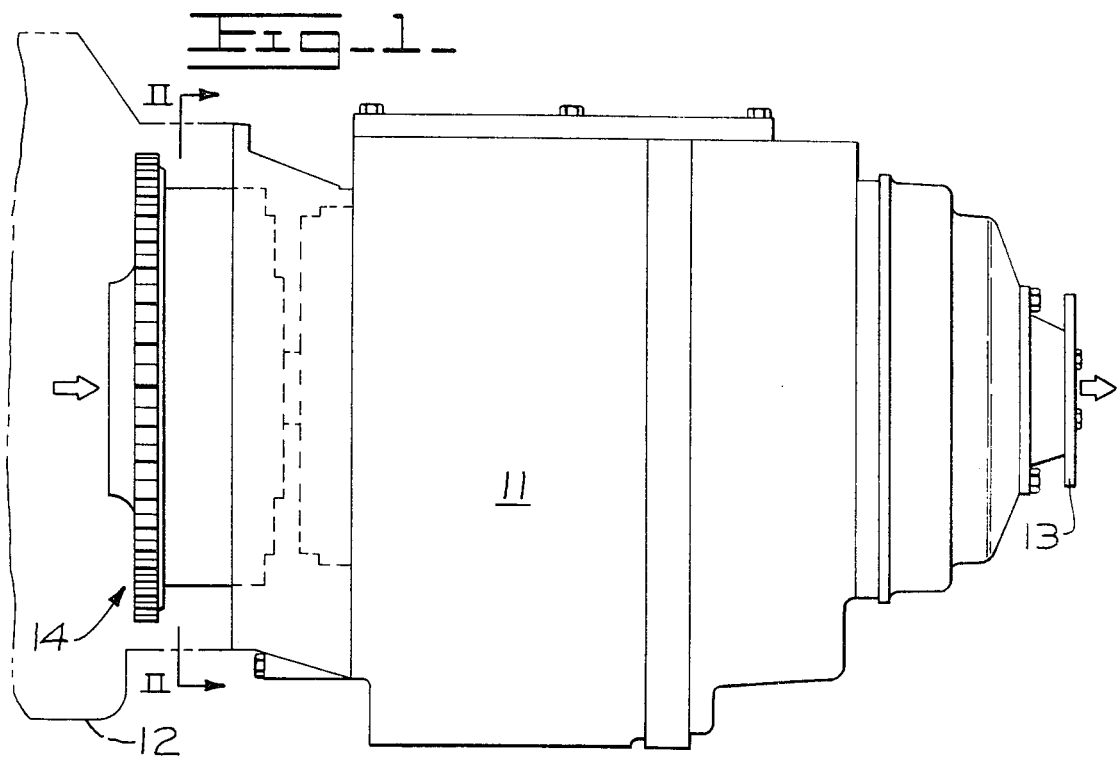
Fig_1_
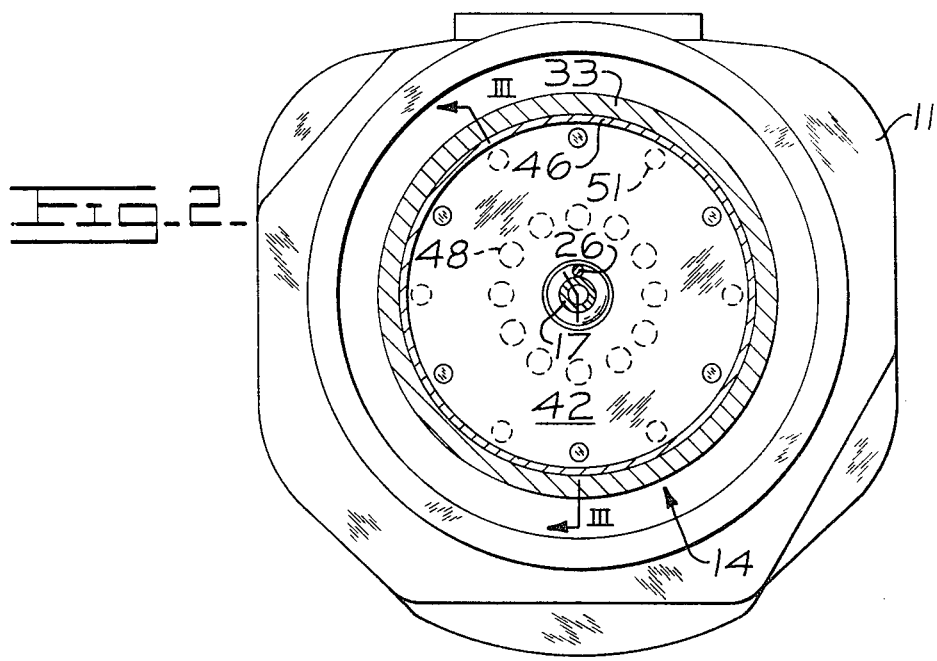
Fig_2_
INVENTOR
ELMER A. RICHARDS
BY
Fryer, Tjensvold, Feix, Phillips & Lempio
ATTORNEYS

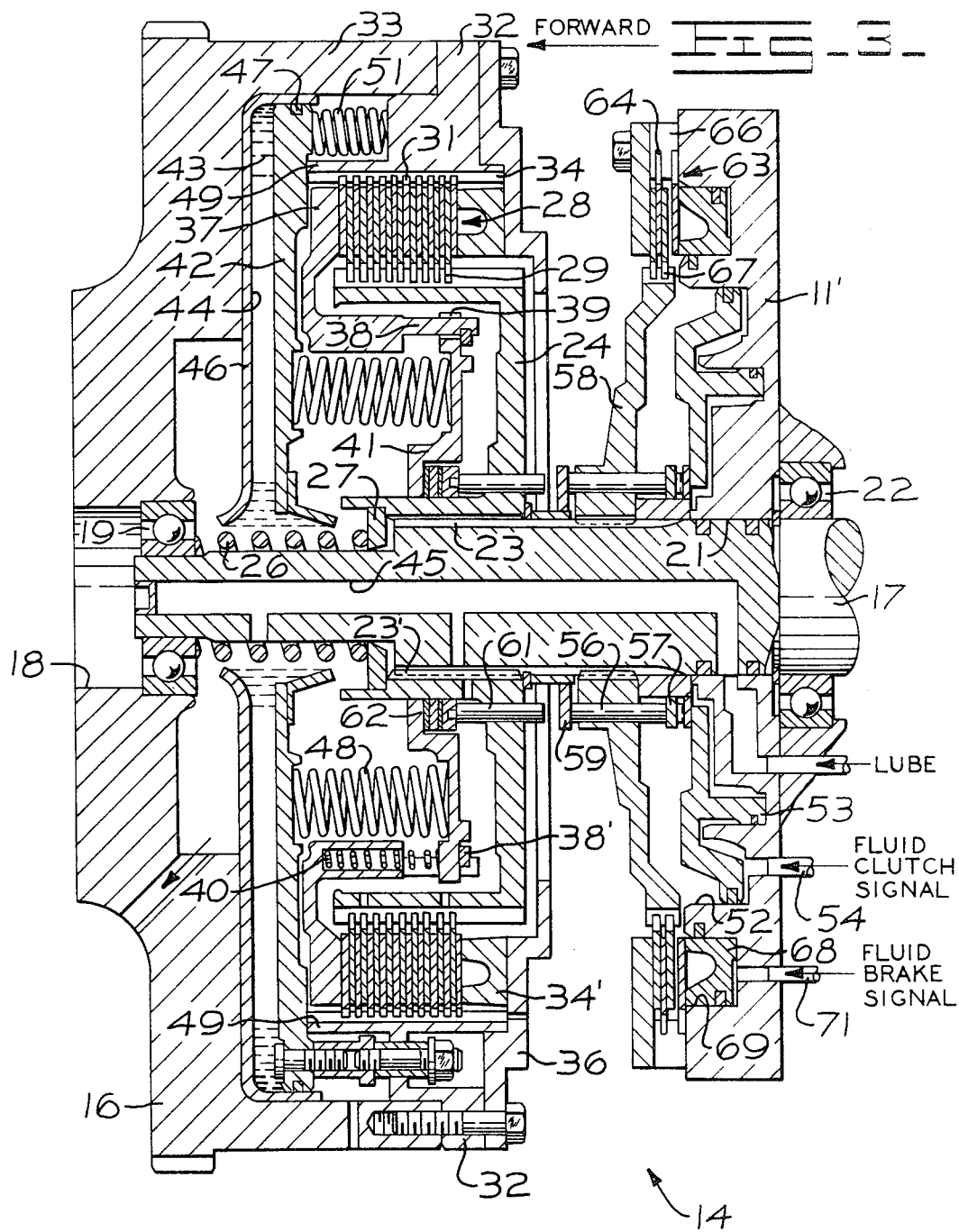

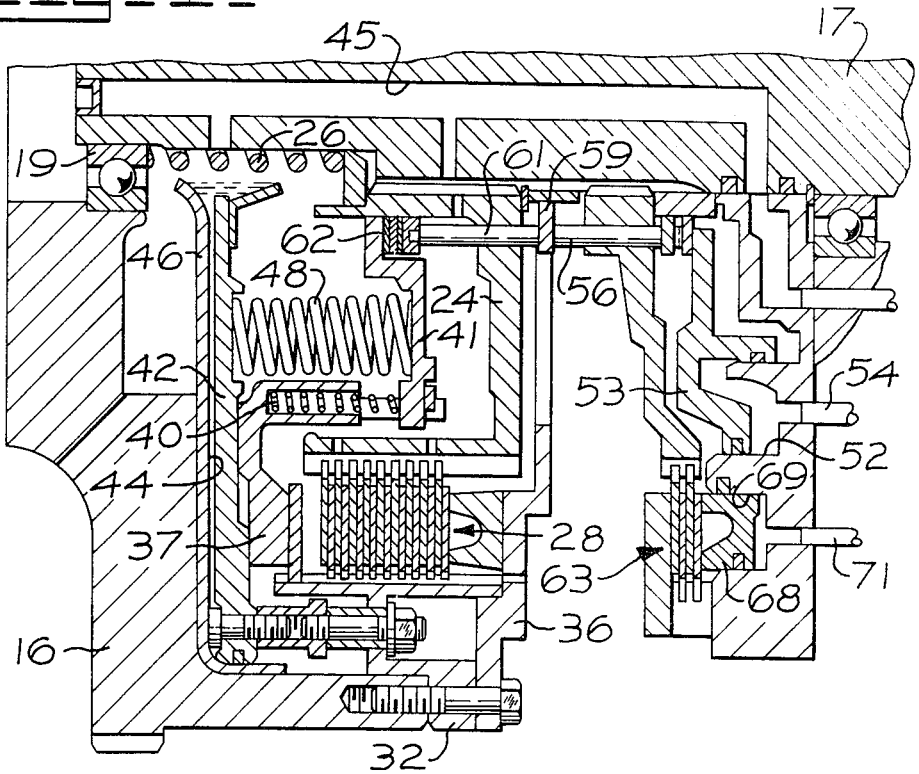

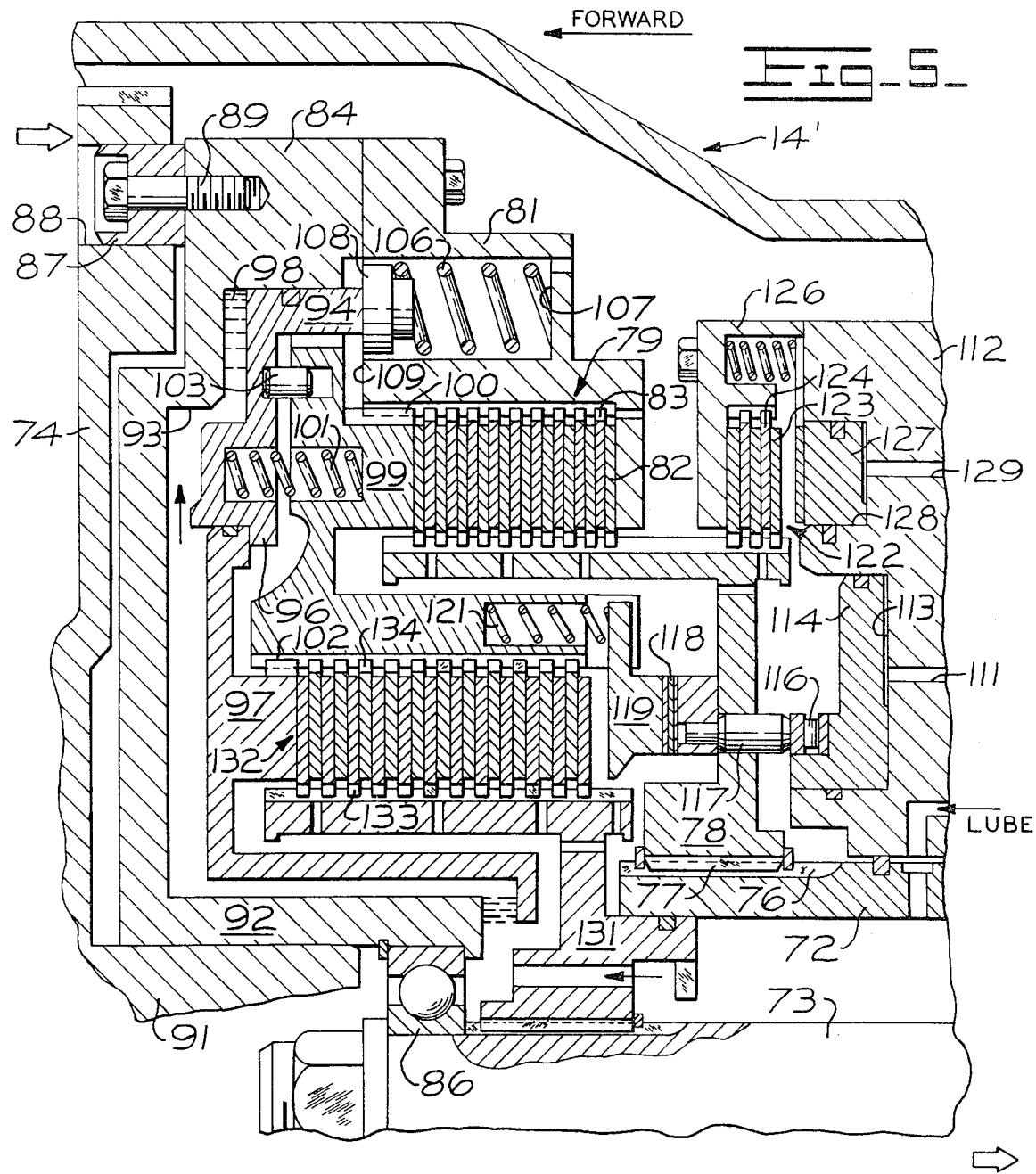

3,667,583

SELF-MODULATED INPUT CLUTCH FOR VEHICLE DRIVE TRANSMISSIONS

BACKGROUND OF THE INVENTION

This invention relates to vehicle drive systems and more particularly to clutches of the class which transmit torque from the engine to a gear box transmission of a vehicle.

Automatic transmissions, utilizing hydrodynamic torque converters, planetary gearing or various combinations thereof, are extensively used in powered vehicles although such transmissions are less efficient in many respects relative to manually shifted or "standard" mechanical transmissions. A major reason for the widespread preference for costly automatic transmissions is that manually shifted transmissions demand a higher degree of operator skill and attention. The difficulties involved in learning to manipulate a clutch pedal efficiently are well known and greater effort and attention are required from even the most skilled operator. A mechanical transmission that can be shifted by a simple movement of a speed selector lever, without requiring operator manipulation of a clutch pedal or the like, has many advantages. Such a unit combines the basic efficiency and low cost of the mechanical transmission with most of the ease of operation of an automatic transmission.

Providing a practical low cost semi-automatic mechanical transmission of this kind has proven to be very difficult. The operator's control functions in connection with the manually operated clutch of a conventional vehicle drive system are complex and require careful judgments. In particular, the clutch must be disengaged when a shift is to be made and also when engine speed drops below a certain value, due to heavy loading or other causes, whereby stalling may occur. Re-engagement of the clutch requires precise modulation to avoid abrupt shock loads. The rate of clutch engagement and timing of the operation are not only critical and sensitive but also must be varied under different operating conditions. Proper modulation at low engine speeds for example, differs considerably from that at high speeds. Under certain special conditions, clutch operation must differ from the normal pattern. In start-up under a heavy load, where the vehicle is stopped on a steep upgrade for example, the clutch should not commence to engage until engine speed reaches a value higher than that at which engagement normally begins.

Prior attempts to provide for automatic clutch control have resulted in complex costly constructions which do not adequately duplicate the judgment and varied actions of a skilled human operator under different conditions.

SUMMARY OF THE INVENTION

This invention is a simple and efficient clutch construction for coupling a vehicle engine and a multispeed mechanical gear box transmission in which clutch functions are self-controlled and no operator's clutch pedal or the like is required. The clutch disengages at low engine speeds and engages at increased engine speeds with a self-modulating effect, the actions of the clutch under different operating situations being variable to duplicate skilled manual control. In part, this is accomplished by utilizing a first resilient means acting to engage the clutch and a second resilient means tending to disengage the clutch together with a centrifugally generated fluid pressure, which varies with engine speed, to modify the relative influence of the two sets of resilient means at different speeds. Further mechanism removes the effect of the fluid pressure on clutch capacity at the higher engine speeds and means are provided for overriding the resilient means to force temporary disengagement in response to movement of the gear shift lever or the like.

Accordingly, it is an object of the invention to provide a practical clutch construction for coupling an engine and a multispeed mechanical gear box transmission of a vehicle wherein the clutch is self controlled.

It is an object of the invention to provide a simple, compact clutch for a vehicle which requires no direct operator control and which duplicates the performance of a skilled operator manipulating a manual clutch pedal.

It is a further object of the invention to provide a self controlled input clutch for a mechanical transmission which is self-disengaging at engine idling speeds, which provides a modulated engagement or disengagement at an intermediate range of engine speeds and which provides a substantially fixed clutch capacity at high engine speeds, and wherein the clutch reacts to special operating situations to modify the engine speed at which certain actions occur.

The invention together with further objects and advantages thereof will best be understood by reference to the following description of preferred embodiments in conjunction with the accompanying drawings.

BRIEF DESCRIPTION OF THE DRAWINGS

In the accompanying drawings:

FIG. 1 is a side elevation view of a portion of a vehicle engine and an associated transmission having an input clutch in accordance with the invention, FIG. 2 is a cross-section view taken along line II—II of FIG. 1 showing internal elements of the input clutch at the forward end of the transmission of FIG. 1, portions of the structure being broken out, FIG. 3 is an axial section view of the input clutch taken along angled line III—III of FIG. 2, FIG. 4 is a fragmentary section view corresponding to the lower half of FIG. 3 and showing certain elements of the clutch thereof at changed positions in the course of shifting the associated transmission, FIG. 5 is a partial axial section view of a second embodiment of the invention, showing a modified construction for use with a transmission which maintains a driving connection between the engine and wheel drive line of a vehicle during a shift transient, and FIG. 6 is a fragment of an axial section view of a clutch construction of the type shown in FIG. 4 illustrating a modified arrangement of certain elements thereof.

DESCRIPTION OF PREFERRED EMBODIMENTS

Referring initially to FIG. 1 of the drawing, a transmission 11 which transmits torque between the engine 12 and wheel drive line 13 of a powered vehicle such as a highway truck is of the type which has a plurality of change speed gears on mainshafting and countershafting to provide for any selected one of a plurality of drive ratios between the engine and drive line. Suitable internal construction for transmissions of this kind is known to the art and accordingly will not be described herein. Transmissions of this general form require an input clutch 14 to disconnect the engine 12 from the gear box input while shifts are made. The particular transmission 11 to which this specific embodiment of the invention is adapted is of a specialized type in which the internal gearing of the transmission is decoupled from both the engine 12 and wheel drive line 13 in the course of a shift and is braked to a stop so that the gears may be shifted while stationary. This dispenses with the need for synchronizers and other complications. A "stop and go" transmission of this type is disclosed in my co-pending application Ser. No. 700,602 filed Jan. 25, 2968 and entitled "Mechanical Drive Transmission" (now U.S. Pat. No. 3,508,450) and reference should be made thereto for an understanding of the detailed construction of a transmission of this form.

To shift a transmission of this kind between speed ratios, the operator must manipulate a shift lever or the like and heretofore has also been required to operate a clutch pedal. In the input clutch 14 of this invention, clutch modulation and certain other functions are self-controlled whereby the clutch pedal may be dispensed with and the operator need only move a speed ratio selector lever or the like to effect shifts.

Referring now to FIGS. 2 and 3 in conjunction, the input to clutch 14 is an annular flywheel 16 which is coupled to the vehicle engine crankshaft by any suitable known means. The clutch output is a transmission input shaft 17 having a forward end which extends into an axial passage 18 in the flywheel 16 and which is journalled therein by a bearing 19. Where the clutch 14 is utilized with a stop and go transmission of the type described in the hereinbefore identified co-pending application Ser. No. 700,602, the principal functions which must be performed by the clutch are as follows:

a. The clutch must disengage in response to a fluid pressure signal indicating that the operator has manipulated a gear shift lever to initiate a shift and must brake the transmission input shaft 17 to a stop or near stop to facilitate the gear changes.

b. At the completion of a shift transient, the pack 63 should release the transmission input shaft 17 and normal drag in clutch 14 will re-accelerate such shaft to some extent, and then must re-engage. The rate of such re-engagement should be carefully controlled with reference to factors such as engine speed, the load on the vehicle drive line and rate of engine acceleration. In other words, the re-engagement of clutch 14 at this time should be modulated in accordance with external conditions.

c. The clutch 14 should be disengaged when the engine is at idling speeds such as at start-up or in the presence of a heavy load which might stall the engine or because the operator has released the throttle in preparation for stopping the vehicle. Re-engagement, when engine speed increases above the idling range, should be a gradual or modulated action.

d. The engine speed at which engagement occurs should be greater than normal if the throttle is opened at a greater than normal rate. Thus, if the vehicle is to be started under a heavy load, the throttle is opened faster than normally and engagement should be delayed until engine speed reaches a relatively high value.

In a typical diesel powered truck drive system of the type for which the invention was designed, the input clutch 14 should be fully disengaged between a governed low idle speed of 600 to 750 rpm and should perform a modulated or slipping engagement or disengagement between 750 and 1,100 rpm except where the engine is accelerated very rapidly in which case significant engagement should be delayed until some higher. From about 1,100 rpm to the maximum governed speed of 2,200 rpm the clutch should be engaged with an essentially fixed capacity, exceeding maximum engine torque, except where disengagement is temporarily forced in response to a fluid signal indicating that a shift is being made.

The clutch construction shown in FIGS. 2 and 3 performs each of the above described functions without requiring direct control by an operator. Considering now the detailed construction of clutch 14, the previously described input flywheel 16 is spaced forwardly from a front wall member 11' of the transmission, with the transmission input shaft 17 extending through a passage 21 in the wall member and being journalled therein by an additional bearing 22. Shaft 17 is provided with longitudinally directed splines 23 forwardly from wall 11' which engage with internal splines 23' of an annular driven hub 24 whereby the shaft is constrained to rotate with the hub but axial movement of the hub is provided for. A compression spring 26 disposed coaxially around shaft 17 adjacent bearing 19 acts against an annulus 27 which abuts hub 24 to urge the hub towards wall 11'. When the clutch 14 engages, hub 24 transmits drive from flywheel 16 to transmission input shaft 17 through a pack 28 of annular clutch plates of which the driven plates 29 are splined coaxially on the radially outermost surface of hub 24.

To couple flywheel 16 with the driving plates 31 of clutch pack 28 an annular input member 32 is secured to the back end of a radially outermost cylindrical portion 33 of the flywheel and has internal splines 34 which engage clutch plates 31. Thus, if the clutch pack 28 is compressed, torque will be transmitted from flywheel 16 to transmission input shaft 17 and if the pressure on the clutch pack is released, the input clutch 14 is effectively disengaged.

Control of the pressure on clutch pack 28 is effected by a combination of elements which respond to operating conditions to achieve the functions hereinbefore described. The back end of the clutch pack 28 abuts an annular stop 34' carried by another annular input member 36 secured to member 32 and thus to flywheel 16. Adjacent the forward end of clutch pack 28 is an annular pressure plate 37 having axially directed tangs 38 which extend rearwardly through slots 39 in an annular plate 41 disposed coaxially on input hub 24 and which is slidable relative thereto. Plate 41 is arranged for a limited amount of free travel but upon being shifted forwardly acts to relieve the force of pressure plate 37 on clutch pack 28 and upon being shifted rearwardly acts to force the plate against the clutch pack by contacting a lip 38' carried by tangs 38. A plurality of small compression springs 40 act between pressure plate 37 and plate 41 to urge the two elements apart.

The engagement or disengagement of clutch pack 28 thus depends on the forces applied to pressure plate 37. To effect the functions previously described, this requires a force which varies under certain operating conditions, and for this purpose, an annular capacity modifying piston plate 42 is disposed within the cylindrical portion 33 of flywheel 16 adjacent the pressure plate and is slidable in an axial direction. A volume of oil 43 is maintained in the chamber 44 between capacity modifying piston plate 42 and the forward end of flywheel 16 whereby centrifugal force, accompanying rotation of the flywheel, produces a fluid pressure against piston 42 with the pressure being essentially a function of engine speed.

Oil 43 is supplied through passages 45 in input shaft 17 and is trapped in chamber 44 by centrifugal force when the flywheel rotates. To provide for a chamber 44 of maximum volume and effectiveness, a liner member 46 defines the forward wall of the chamber and extends substantially to the region of compression spring 26. Liner 46 extends rearward adjacent the inner surface of flywheel portion 33 for a distance exceeding the possible travel of capacity modifying piston 42 and an annular seal 47 is mounted in the rim of piston 42 to engage the liner 46 to provide a fluid tight seal therebetween. Accordingly, the piston 42 is urged rearwardly by a fluid pressure which tends to be a function of engine speed although as will hereinafter be discussed, desirable momentary departures from a strict correlation occur under certain operating conditions.

A plurality of compression springs 48 are spaced angularly around the axis of shaft 17 between capacity modifying piston 42 and plate 41 to exert a force on pressure plate 42 tending to engage the clutch 14. As the engagement springs 48 react against piston 42, the engagement force which pressure plate 37 exerts on clutch pack 28 is determined not only by the parameters of the springs but also by the axial position of piston 42 as it responds to the centrifugally generated fluid forces thereon. This tends to increase the engagement force acting on clutch pack 28 as engine speed increases to modulate the capacity of clutch pack 28 in accordance with engine speed at the lower range of speeds as hereinbefore discussed.

In most piston engines, such as a gasoline or diesel engine, a graph of output torque as a function of engine speed becomes progressively flatter at higher speeds. Accordingly, at the higher engine speeds, it is desirable that the clutch capacity variation with speed be less pronounced and the capacity may in fact be essentially constant. Thus, to remove the capacity varying effect of oil volume 43 at a predetermined intermediate engine speed, an annular stop 49 extends forwardly from input member 32 to a position where rearward movement of modifying piston 42 is stopped at the predetermined engine speed. Thus, when the piston 42 contacts stop 49 further increases in engine speed do not effect the capacity of clutch pack 28, the capacity then being determined solely by the constants of engagement springs 48.

As previously described, it is desirable that the clutch 14 completely disengage below a predetermined low engine speed. This requires a force acting forwardly on modifying piston 42 sufficient to overcome the fluid pressure thereon at low engine speeds and for this purpose a plurality of disengagement springs 51 are spaced angularly around the axis of shaft 17 between modifying piston 42 and input member 32.

Thus, the disengagement springs 51 supplement the force of springs 48 on modifying piston 42 but, unlike springs 48, do not react against pressure plate 37. Prior to abutment of modifying piston 42 against stop 49, disengagement springs 51 assist springs 48 in opposing the fluid pressure force. Once the modifying piston 42 has shifted into abutment with stop 49 because higher engine speeds have been reached, disengagement springs 51 no longer influence the capacity of the clutch 14 which is then determined solely by the force of springs 48.

In operation, at a predetermined low engine speed springs 51 hold piston 42 forward to maintain disengagement of the clutch 14 thereby decoupling the vehicle engine from the transmission 11. As the engine speed exceeds this level, a modulated engagement of the clutch occurs as the centrifugally generated pressure of fluid 43 increasingly overcomes the force of the springs 51 and 48 to gradually engage the clutch. Above a higher predetermined engine speed, modifying piston 42 has abutted stop 49 and the clutch is fully engaged with a predetermined capacity determined by the springs 48. As engine speed decreases from a high value, a reverse action occurs in that slipping of the clutch commences at an intermediate level and progresses into complete disengagement at a still lower level. An important aspect of the invention is that these actions do not always occur at precisely the same engine speeds.

In particular, if engine speed increases very rapidly at start-up, due to a rapidly opened throttle, the inertia of the fluid volume 43 tends to cause the centrifugal pressure in chamber 44 to lag behind engine speed and therefore to delay the modulated engagement of the clutch momentarily. If, for example, modulated engagement normally begins when the engine speed reaches 750 rpm, the inertia effect may delay the beginning of engagement until about 1,200 rpm in the case where the engine is accelerated more rapidly than is the case in a normal start-up. This is significant in that rapid engine acceleration from low idle with the clutch disengaged is a skilled operator's normal action when his vehicle must be started up under heavy load or while stopped on a steep incline.

Disengagement of the clutch 14 must be forced, regardless of engine speed, to prepare for a shift of the associated transmission. Accordingly, the forward face of transmission wall 11' has an annular cavity 52 and an annular piston 53 is disposed therein. A conduit 54 communicates with cavity 52 behind piston 53 to admit fluid pressure when a shift is to be made in order to force the piston 53 forwardly. A control system suitable for supplying such a fluid signal in response to the operator's manipulation of a transmission shift lever between speed ratio settings is disclosed in co-pending application Ser. No. 801,405 filed Feb. 24, 1969 and entitled "Pneumatic Shift Control for a Mechanical Transmission" (now U.S. Pat. No. 3,508,450).

Upon application of fluid pressure to conduit 54, piston 53 is moved forwardly and acts against a series of pins 56 through an annular needle bearing 57 thereby shifting the pins forwardly. Pins 56 are transpierced through an annular brake hub 58, splined to transmission input shaft 17, and bear against a ring 59 which is slidable along the input shaft. After a limited amount of such motion, ring 59 contacts the ends of a similar set of pins 61 transpierced through the driven hub 24. Pins 61 in turn bear against member 41 through a friction disc 62. Thus, the initial forward movement of piston 53 does not affect the clutch pack 28 until ring 59 contacts pins 61 and thereafter further movement acts to force modifying piston 42 forward by compressing springs 42 and 48. As shown in FIG. 4, this action relieves the pressure of engagement on the clutch pack 28 and thereby disengages the clutch in order that the transmission may be shifted. At the completion of the shift, the fluid pressure in signal conduit 54 is relieved and the above described action is reversed to re-engage the clutch. The friction disc 62 acts to impart some initial acceleration to transmission input shaft 17 in advance of engagement of the clutch to assure that all gears in the transmission mesh before the full torque force is applied. During re-engagement, appropriate modulation occurs as hereinbefore described.

In addition to decoupling the transmission input shaft 17 from the engine in preparation for a shift, a transmission of the particular type described in co-pending application Ser. No. 700,602 (now U.S. Pat. No. 3,508,450) requires that the input shaft be braked to a stop prior to shifting gears. For this purpose, a brake disc pack 63 is operative between transmission wall 11' and brake hub 58. Alternate plates 64 of pack 63 are splined to an annular member 66 secured to wall 11' and the intervening brake plates 67 are splined to the brake hub 58. A second piston 68 is disposed within an annular cavity 69 in transmission wall 11' and a brake signal conduit 71 communicates with a cavity to receive a fluid pressure signal at the start of the shift whereby the piston is forced forwardly to compress the plates 64 and 67 thereby stopping the transmission input shaft 17. Means for generating the necessary braking signal and for coordinating such signal with the disengagement signal to conduit 54 are described in the hereinbefore identified co-pending application Ser. No. 801,405 (now U.S. Pat. No. 3,570,636).

Variations in the clutch construction are possible and additional self-regulating functions can be included. One form of the transmission described in the hereinbefore identified co-pending application Ser. No. 700,602 (U.S. Pat. No. 3,508,450) for example, provides for continuous transmission of drive from the vehicle engine to the drive line during the course of a gear shift. A modified example of the clutch 14', illustrated in FIG. 5, has provision for maintaining the continuous drive throughout the shift transient.

The form of transmission discussed immediately above has two input shafts including a hollow input shaft 72 to the change speed gears and an additional through-drive input shaft 73 which is disposed coaxially within shaft 72 and which connects directly to the vehicle wheel drive line independently of the change speed gearing, suitable detailed construction for such a transmission being disclosed in the above identified co-pending application Ser. No. 700,602 (U.S. Pat. No. 3,508,450). Input shaft 72 is coupled to the input flywheel 74 by input clutch 14', except at idling engine speeds or during the shift transient, while the through-drive shaft 73 is decoupled from the flywheel at such times. During the shift period, when input shaft 72 is decoupled from flywheel 74, through drive shaft 73 is coupled to the flywheel to maintain a driving connection to the wheels as will hereinafter be discussed in more detail.

To transmit torque from flywheel 74 to transmission input shaft 72 under non-transient conditions, the forward end of shaft 72 has splines 76 engaging internal splines 77 of a coaxially disposed driven hub 78 whereby the shaft 72 is constrained to rotate with the hub. An input clutch pack 79 is disposed between hub 78 and an annular input member 81 coupled to flywheel 74, the driven clutch plates 82 being splined to the hub and the intervening driving plates 83 being splined to member 81. Member 81 is secured to an additional annular input member 84 which is journalled on the forward end of through drive shaft 73 by a bearing 86.

Input member 84 is constrained to rotate with flywheel 74, while being capable of small axial movements relative thereto, by means of a series of button connectors 87 which extend from member 84 into bores 88 in the flywheel. Upon assembling the structure, the buttons 87 are loosely mounted on member 84 by axially directed bolts 89 and member 84 and flywheel 74 are brought together with a pilot projection 91 at the center of the flywheel being entered into a central sleeve portion 92 of member 84. Bolts 89 are then tightened. The close coupling button arrangement has the advantage that no axial thrust loads are communicated to the crank shaft bearings of the associated engine.

To modulate engagement and disengagement of clutch pack 79 at low engine speeds, member 84 is formed with an annular cavity 93 and an annular outer piston 94 is disposed in the radially outermost portion of the cavity. Outer piston 94 has a lip 96 at the radially inward edge which abuts the back of the rim of an inner piston 97 which is disposed in the radially innermost portion of cavity 93. When input member 94 rotates, cavity 93 traps a volume of oil 98 whereby in operation a centrifugally generated fluid pressure is exerted against the pistons 94 and 97 to urge the piston backward from member 84. An axially movable clutch pressure plate 99 is disposed adjacent outer piston 94 to act against the forward end of the clutch pack 79 and a plurality of engagement springs 101 are disposed between the outer piston and pressure plate. Springs 101 thus exert a force tending to engage the input clutch pack 79 and this force may be modified by movement of the outer piston 94 in response to variations in the centrifugally generated fluid pressure. Pressure plate 99 is constrained to rotate with the flywheel 74 by a spline connection 100 to input member 81 and rotates inner piston 97 through a spline coupling 102. A series of dowel pins 103 between pressure plate 99 and outer piston 96 serve to rotate the outer piston.

The action of springs 101 opposing the fluid pressure on pistons 96 and 97 is supplemented by a series of disengagement springs 106 disposed in bores 107 in member 81 and acting on the back end of outer piston 94 through buttons 108 at the forward end of each spring. As in the previously described embodiment, it is desirable that the capacity varying effect of the fluid 98 on clutch pack 79 be eliminated at an intermediate engine speed. This is accomplished by abutment of piston 94 against the front surface 109 of member 81.

Disengagement of the clutch 14' in preparation for a shift is initiated by a fluid pressure signal received in a bore 111 in the forward wall 112 of the transmission. Bore 111 communicates with an annular cavity 113 containing a piston 114. Forward movement of piston 114 in response to the shift signal acts to advance clutch pressure plate 99 through a needle bearing 116, pins 117 which are transpierced through input hub 78, a friction disc 118 and a member 119 which acts against the clutch pressure plate, a series of springs 121 being disposed between member 119 and the pressure plate 99 to retract piston 114 when the fluid pressure signal is released from bore 111. To brake the transmission input shaft 72 at this time to provide for gear changing, a brake pack 122 has alternate plates 123 splined to driven hub 78 with the intervening plates 124 being splined to an annulus 126 secured to transmission wall 112. A brake piston 127 in a cavity 128 in wall 112 is advanced by a fluid pressure signal received at bore 129 to compress plates 123 and 124 and perform the braking function. As shown in FIG. 6, the brake piston 127' may be combined with the disengagement initiating piston 114', if desired, although the use of two separate pistons as shown in FIG. 5 has the advantage that the timing of the application of brake 122 relative to operation of clutches 79 and 132 may be adjusted for optimum performance.

Accordingly, although the structure varies somewhat from the previously described embodiment, the input clutch 14' of FIG. 5 as described to this point functions in an essentially similar manner as that of the embodiment of FIGS. 1 to 4. Considering now the structure for the supplementary function of controlling the through-drive shaft 73, an output hub 131 is disposed coaxially on the through-drive shaft and is splined thereto. An output clutch pack 132 has driven plates 133 splined to output hub 131 with the intervening driving plates 134 being splined to clutch pressure plate 99. Clutch pack 132 is positioned for compression against inner piston 97 by the above described forward movement of member 119 in response to a shift signal at bore 111.

Thus, concurrently with the disengagement of the clutch pack 79 in preparation for a shift, drive is transmitted from flywheel 74 to through-drive shaft 73 by an engagement at output clutch pack 132. At the conclusion of the shift transient a reverse action occurs in that through drive shaft 73 is disengaged from flywheel 74 as the transmission input shaft 72 is engaged thereto.

The engagement between flywheel 74 and through drive shaft 73 during the shift transient is a speed sensitive one as the pressure on clutch pack 132 exerted by piston 97 will vary in accordance with variations of the centrifugal fluid pressure in oil volume 98. The clutch connection through pack 132 must be capable of slipping to avoid abrupt shock loads and the modulating action of the fluid volume 98 makes the degree of slipping an inverse function of engine speed whereby the engine output during the shift period is more fully utilized without adverse effects. For example, if a downshift is made as the vehicle travels up a hill, the heavy loading on the engine normally means that engine speed is low at this time. Due to the low engine speed the pressure applied to output clutch pack 132 is relatively low thereby avoiding the risk of lugging the engine down to the stall point. Conversely, an upshift is generally made in the presence of relatively high engine speed and the capacity modifying effect of oil volume 98 will act at this time to increase the pressure applied to the output clutch pack 132.

The lip 96 on outer piston 94 causes the inner piston 97 to supplement the outer piston in applying a modulating force to input clutch 79. When member 119 is advanced to engage the output clutch 132 the inner piston 97 is forced forward relative to outer piston 94. Thus the pressure acting on the output clutch during the shift transient is determined only the inner piston 97.

What is claimed is:

1. A clutch for coupling a vehicle engine to an input of a change speed gear box of said vehicle, comprising:
    a rotatable input member having means for connection to said engine and having means defining a chamber for containing a fluid volume wherein centrifugal force generates a pressure within said fluid which is a function of engine speed,
    a driven member having means for connection to said change speed gear box input,
    a plurality of input clutch plates including at least one driving plate coupled to said input member and at least one driven plate coupled to said driven member,
    an input clutch capacity modifying member exposed to said fluid pressure of said chamber of said input member and being movable in response to increases of said pressure to produce a force tending to engage said clutch plates,
    at least one engagement spring acting between said capacity modifying member and said clutch plates to transmit said engagement force therebetween,
    at lease one disengagement spring acting against said capacity modifying member to resist said movement thereof to prevent engagement of said clutch plates until said fluid pressure reaches a predetermined low value which is greater than the value corresponding to the idling speed of said engine, whereby said gearbox input is decoupled from said engine at said idling speed thereof, and
    a stop blocking said movement of said capacity modifying member after said fluid pressure reaches a value which is intermediate between said low value and a value corresponding to maximum engine speed whereby changes of said fluid pressure change the capacity of said clutch at lower engine speeds only and the capacity of said clutch is substantially constant and determined by said engagement spring after said movement of said capacity modifying member is blocked by said stop.

2. The combination defined in claim 1 further comprising fluid signal actuated means for relieving the force of said capacity modifying member against said input clutch plates to disengage said clutch plates for facilitating shifting of said gear box at engine speeds above said idling speed thereof.

3. A clutch for transmitting torque from a vehicle engine to the input of a change speed gear box transmission of said vehicle, comprising:
    an annular rotatable input member having means for connection to said engine and having means defining an annular liquid retaining chamber whereby centrifugal force generates a fluid pressure in said chamber which is a function of the rate of rotation of said input member, an annular driven hub disposed coaxially with respect to said input member and being drivingly coupled to said transmission input shaft, a pack of annular input clutch plates disposed coaxially with respect to said input member, said pack having at least one driving plate constrained for rotation with said input member and having at least one driven plate constrained for rotation with said driven hub, an annular pressure plate disposed coaxially with respect to said clutch plates for exerting a force thereon tending to engage said driving and driven plates thereof, an annular clutch capacity modifying member disposed in said chamber of said input member and exposed to said fluid pressure therein, said input clutch capacity modifying member being movable axially in response to changes of said fluid pressure, at least one engagement spring acting between said capacity modifying member and said pressure plate for exerting a force on said pressure plate tending to engage said input clutch plates, at least one disengagement spring acting on said capacity modifying member in opposition to the force of said fluid pressure thereon whereby said engagement spring is ineffective to engage said input clutch plates until said fluid pressure reaches a first predetermined level, and stop means blocking movement of said capacity modifying member in response to increasing fluid pressure after said fluid pressure reaches a second higher predetermined level whereby changes of said fluid pressure affect the capacity of said clutch only at an intermediate range of engine speeds, said capacity being substantially constant and being determined by said engagement spring at the highest range of engine speeds.

4. The combination defined in claim 3 wherein said input of said transmission is a shaft extending along the axis of rotation of said input member and has a passage with a radially directed outlet for supplying oil to said chamber of said input member whereby said oil is trapped in said chamber by centrifugal force to produce said fluid pressure.

5. The combination defined in claim 3 further comprising an annular plate disposed coaxially with respect to said clutch pressure plate and being movable axially between a first position at which said annular plate urges said pressure plate against said clutch pack and a second position at which said annular plate urges said pressure plate away from said clutch pack, said annular plate being capable of a limited amount of free travel between said first and second positions, said engagement spring acting between said annular plate and said capacity modifying member to exert said engagement force on said pressure plate by urging said annular plate towards said first position, said combination further comprising means for forcing said annular plate to said first position thereof to relieve the force of said engagement spring on said clutch pack whereby said transmission may be shifted.

6. The combination defined in claim 3 wherein the output element of said vehicle engine is a rotary flywheel having a plurality of passages spaced angularly around the axis of rotation thereof and directed in parallel relation to said axis and wherein said input member of said clutch is disposed adjacent said flywheel in coaxial relationship therewith, and wherein the means coupling said input member to said flywheel comprises a plurality of cylindrical buttons secured to said input member and extending therefrom into said passages of said flywheel.

* * * * *